Nov. 21, 1950   F. N. BARD   2,531,020
JOINT
Filed March 14, 1946
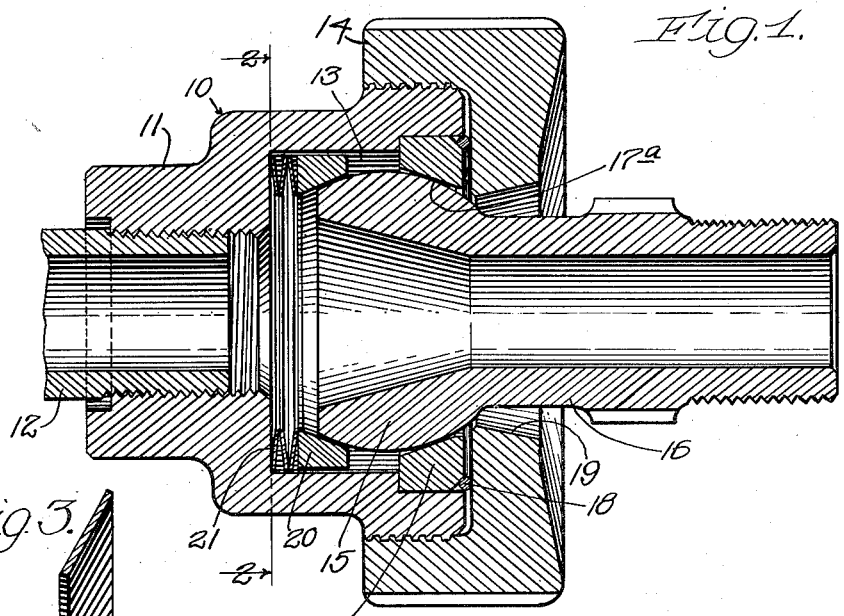
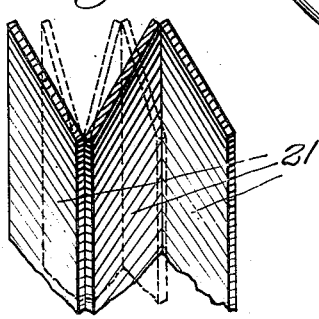
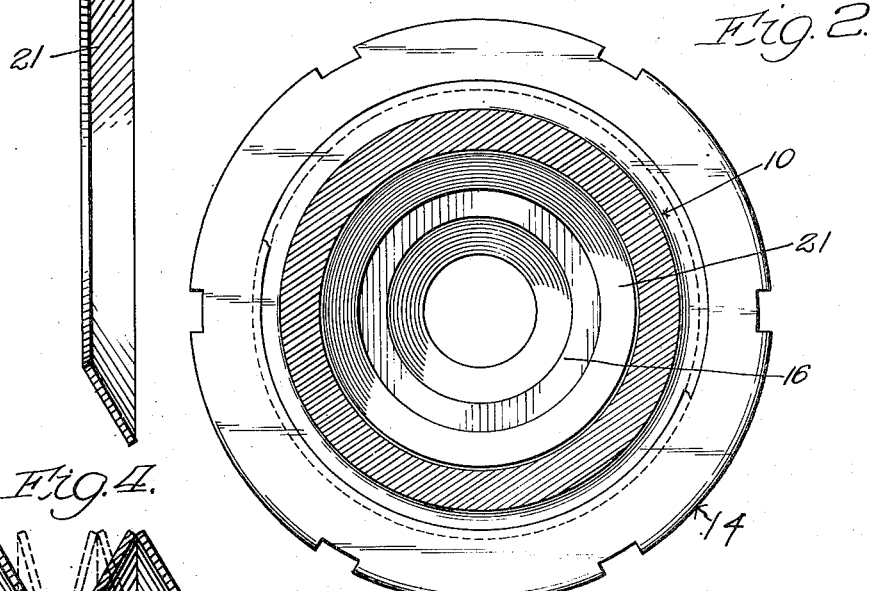
Inventor:
Francis N. Bard,
By Chritton, Schroeder, Merriam & Wegner,
Attys.

Patented Nov. 21, 1950

2,531,020

UNITED STATES PATENT OFFICE 2,531,020

JOINT

Francis N. Bard, Highland Park, Ill.

Application March 14, 1946, Serial No. 654,419

4 Claims. (Cl. 285—95)

The present invention relates to a joint and more particularly to a flexible ball joint adapted to operate under very high pressure.

An object of the invention is to provide a flexible ball joint which is compact and rugged and operable under extremely high pressures. Ball joints heretofore in use have included a ball, a gasket providing a seat in which said ball moves, and spring means for forcing said ball against the seat, said spring means sometimes comprising a centrally located spring adapted to maintain a constant pressure against the ball as it is moved angularly with respect to the seat. Such springs are expensive and require a chamber above the joint which of course adds to the size and expense of the construction.

An object of the invention is to provide a novel sealing means for such a ball joint comprising a deformable washer, as an O-ring of soft metal or like material, between the seat member for the ball member and the side and bottom of the casing and which will be partly flattened by the high pressure exerted against the ball member to seal the space between the seat and the chamber walls.

The invention also includes a novel annular member above the ball member, or at the end of the ball member opposite the end contacted by the ball seat gasket. This annular member may be a gasket similar to the ball seat gasket. Above it, or between it and the end wall of the ball chamber is any suitable spring means, here shown as, a plurality of dish-shaped leaves or washers of spring steel. When the joint is assembled, the ball seat is forced against the ball and the nut, which forms the end of the ball chamber, and the ball seat exert a pressure against the O-ring to flatten its edges and force it into a leak-proof seat for the ball seat gasket, such seat being between the gasket and the end and side of the chamber.

Another object is to provide a spring means in the ball chamber for forcing the ball against its seat which means will eliminate the necessity for an extra chamber in the joint casing for the spring.

Other objects and advantages of this invention will be apparent from the following specification and the drawings, in which:

Fig. 1 is a vertical sectional view of a joint embodying my invention;

Fig. 2 is a view taken on the line 2—2 of Fig. 1;

Fig. 3 is an enlarged sectional view of a washer used in the spring assembly;

Fig. 4 is an enlarged fragmentary sectional view of the spring assembly prior to and after assembly.

In the embodiment of the invention shown in the drawings 10 represents a casing having a neck 11 adapted to have a pipe or conduit section 12 threaded into it. The pipe might be a section of a conduit where the fluid is subjected to very heavy pressure such as 6,000 lb. per square inch. This neck leads to the ball chamber 13 and the other end of the casing is externally threaded to receive a nut 14 providing an end wall for the chamber 13 and a retaining means for the ball member 15 which member has an outer surface which is substantially the central segment of a sphere. This ball member comprises one end of a pipe or conduit section 16, the other end of which is threaded for attachment to another section of a conduit.

The ball chamber is provided adjacent its outer end with a shoulder and an annular sealing and bearing means 17, as a gasket, which is inserted between this shoulder and the nut 14 to provide a seat for the ball. This gasket has an angular surface 17a which maintains a line contact with the ball. In cases where the gasket is of softer material than the metal in the ball the ball will wear a seat in the gasket. The outer side of the gasket is formed with an angular corner providing a space for an O-ring 18 to prevent leakage between the gasket and the side of the chamber. The opening 19 in the nut is of substantially greater diameter than the part of the pipe section 16 extending therethrough so as to permit limited angular movement of this section.

The O-ring 18 may be of soft metal, as copper, and, as heavy pressure is applied to the ball member and gasket, the latter forces the seal against the nut 14 and the side wall of the ball chamber 13 so as to deform the O-ring until it assumes a somewhat triangular shape (in cross section) and thereby substantially fills up the space between the gasket, chamber wall and nut, and effectively seals the outer side of the gasket to prevent leakage between it and the chamber wall. The line contact between the inner side of the ball seat gasket and the ball member, which is maintained by the springs and aided by the internal pressure of the fluid flowing through the joint, prevents leaking on the inner side of the gasket.

In order to maintain the ball in tight engagement with its seat a second annular means 20, as a gasket, is inserted in the inner end of the ball chamber and between it and the inner wall or top of the chamber are positioned a plurality of oppositely disposed, dish-shaped washers 21 of spring steel which tend to force the gasket 20 against the ball. This gasket 20 also has an angular face which at least initially maintains a line contact with the upper outer surface of the ball.

The spring washers 21 are easily and quickly installed by merely dropping them into the ball chamber after inverting it so that they come to rest on its top portion or wall. The gasket or annular member 20 is then dropped into the ball chamber against the washers and, when the ball member and its associated parts are inserted into the chamber, the members 20 and 21 will be forced into proper position by screwing on the nut 14. The washers 21 being oppositely disposed will be forced by the member 20 against the end of the ball chamber and their angle of curvature sharply reduced by pressure developed against them when the joint is assembled. Preferably the washers are dished initially at an angle of 30° to 40° which angle is reduced about 50% upon assembly of the device (see Fig. 4). This provides a strong spring action that will stand up under great strain without permanent deformation.

As more fully disclosed in my copending application Serial No. 605,063, now Patent No. 2,473,502, granted June 21, 1949, of which this application is a continuation-in-part, the joint herein disclosed provides a construction wherein the ball may move with respect to the ball chamber, but with gasket means on both sides of the ball seat. The means for forcing the ball against its seat is of simple and very rugged construction, but is most effective and capable of long wear without adjustment or replacement of any part. The joint may moreover be easily and quickly assembled and disassembled.

While I have shown and described certain embodiments of my invention, it is to be understood that it is capable of many modifications. Changes therefore in the construction and arrangement may be made without departing from the spirit and scope of the invention as disclosed in the appended claims.

I claim:

1. A flexible joint of the character described comprising: a casing; a ball member movable therein, an annular means in said casing and in sealing engagement with one side of said member; a second annular means in engagement with the other side of said member, at least one of said means being a seal; and a plurality of oppositely angularly disposed spring washers between said second means and the inner wall of said casing and so arranged as to maintain said second means against said member but permitting relative movement therebetween, the initial angle of said spring washers being very substantially reduced when the joint is assembled.

2. A flexible joint of the character described comprising: a casing; a ball member movable therein, an annular means in said casing and in sealing engagement with one side of said member; a second annular means in engagement with the other side of said member, at least one of said means being a seal; and a plurality of oppositely disposed spring washers between said second means and the inner wall of said casing and so arranged as to maintain said second means against said member but permitting relative movement therebetween, said washers being initially formed at an angle of 30°–40°, said angle being reduced about 50% when the joint is assembled.

3. In a flexible joint comprising a casing having a cylindrical portion and an annular shoulder at one end thereof providing a corner space, a ball member movable in said casing, an annular ball-sealing member slidably engaging the cylindrical portion of the casing and the ball, said ball-sealing member having a chamfered corner, means for sealing between the casing and the ball-sealing member comprising a soft metal second annular sealing member disposed between the ball-sealing member and the cylindrical and shoulder portions of the casing at the juncture thereof so that pressure of fluid flowing through the joint forces the ball-sealing member toward said second annular member and causes it to flow outwardly in said corner space.

4. In a flexible joint comprising a casing having a cylindrical portion and an annular shoulder at one end thereof providing a corner space, a ball member movable in said casing, an annular ball-sealing member slidably engaging the cylindrical portion of the casing and the ball, spring means urging said ball member against said annular ball-sealing member, means for sealing between the casing and the ball sealing member comprising a second annular sealing member disposed between the ball-sealing member and the cylindrical and shoulder portions of the casing at the juncture thereof, said second sealing member being of distortable material so that pressure of fluid flowing through the joint forces the ball-sealing member toward said second annular member and causes it to flow outwardly in said corner space.

FRANCIS N. BARD.

REFERENCES CITED

The following references are of record in the file of this patent:

UNITED STATES PATENTS

| Number | Name | Date |
|---|---|---|
| 1,034,425 | Copeland | Aug. 6, 1912 |
| 1,268,259 | Martin | June 4, 1918 |
| 1,604,868 | Woodruff | Oct. 26, 1926 |
| 2,303,642 | Hoy | Dec. 1, 1942 |
| 2,387,266 | Holland | Oct. 23, 1945 |